United States Patent [19]

Sul et al.

[11] Patent Number: 5,772,980

[45] Date of Patent: Jun. 30, 1998

[54] FIBROUS ZEOLITE ZSM-5 AND PREPARATION METHOD THEREOF

[75] Inventors: Yong-gun Sul; Kyeong-taek Jung, both of Seoul; Jin-ho Hyun, Incheon; Du-soung Kim; Young-chul Gil, both of Seoul, all of Rep. of Korea

[73] Assignee: Daelim Engineering Co., Ltd., Seoul, Rep. of Korea

[21] Appl. No.: 733,149

[22] Filed: Oct. 16, 1996

[30] Foreign Application Priority Data

Mar. 11, 1996 [KR] Rep. of Korea .................... 96-6324

[51] Int. Cl.⁶ .......................... C01B 39/06; C01B 39/36
[52] U.S. Cl. .................. 423/705; 423/713; 423/716; 423/DIG. 22; 502/77
[58] Field of Search .................. 423/700, 701, 423/702, 704, 705, 713, 716, DIG. 22, 327.1, 328.1, 328.2; 502/77

[56] References Cited

U.S. PATENT DOCUMENTS

| | | | |
|---|---|---|---|
| 4,797,267 | 1/1989 | Kuehl | 423/DIG. 22 |
| 5,110,573 | 5/1992 | Johnson | 423/328 |
| 5,182,090 | 1/1993 | Dwyer et al. | 423/704 |
| 5,411,724 | 5/1995 | Beyer et al. | 423/328.2 |
| 5,558,851 | 9/1996 | Miller | 423/702 |
| 5,582,819 | 12/1996 | Shul et al. | 423/705 |
| 5,624,658 | 4/1997 | Fitoussi et al. | 423/702 |
| 5,656,252 | 8/1997 | Tuel et al. | 423/705 |

*Primary Examiner*—Mark L. Bell
*Assistant Examiner*—Louis M. Troilo
*Attorney, Agent, or Firm*—Leydig, Voit & Mayer, Ltd.

[57] ABSTRACT

There are disclosed a fibrous zeolite ZSM-5 and a preparation method thereof. The fibrous zeolite ZSM-5 which is represented by $xSiO_2$ $(1-x)Al_2O_3$ (x is 0.9429–0.9943) can be directly used as a reinforcement material because of its fibrous form, and has sufficient sites on which other substances can be easily adsorbed and from which the adsorbed substances can be easily desorbed. Also, the fibrous zeolite can be applied to an optical material due to its transparent property.

9 Claims, 4 Drawing Sheets

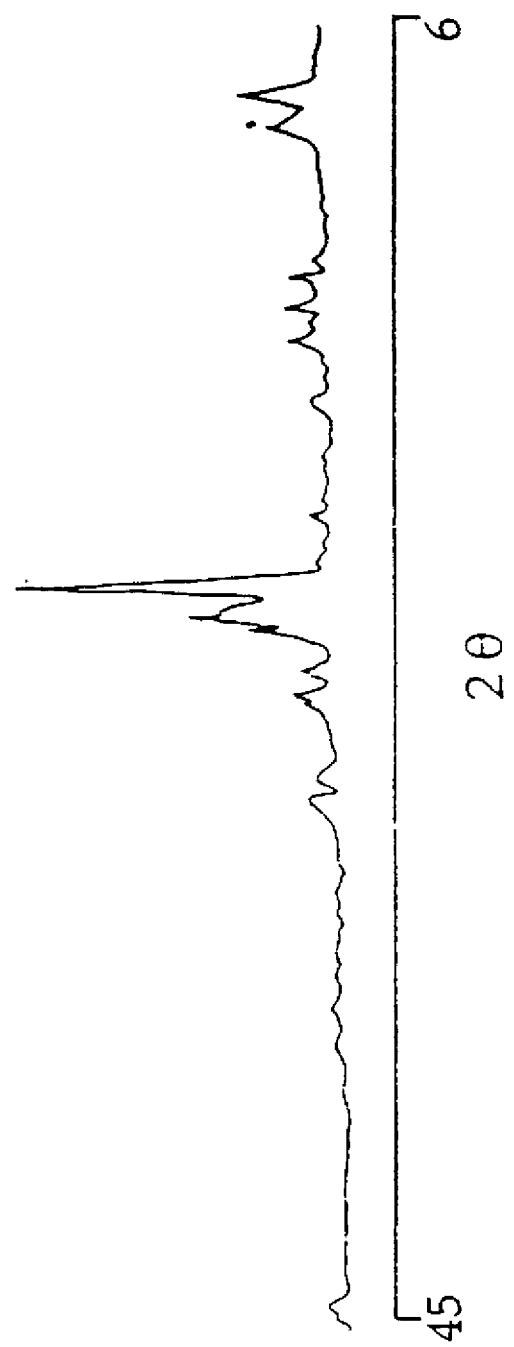

FIBROUS ZEOLITE ZSM-5 AND PREPARATION METHOD THEREOF

BACKGROUND OF THE INVENTION

The present invention relates to a zeolite ZSM-5 and a preparation method thereof, and more particularly, to a fibrous zeolite ZSM-5 which is transparent, can be directly used as a reinforcement material and provide sites on which other substances can be easily adsorbed and from which the adsorbed substances can be easily desorbed and a preparation method thereof.

Zeolite has been widely used as a detergent, catalyst, adsorbent, moisture absorbent and the like in various industrial fields. Particularly, a synthetic zeolite is far superior to a natural zeolite in its pore size, crystalline structure and purity, and therefore synthetic zeolites are preferred for industrial use.

Zeolite is usually manufactured in powder form, however, it may be in various other forms depending on the composition thereof. As a typical zeolite, zeolite X (U.S. Pat. No. 2,882,244), zeolite Y (U.S. Pat. No. 3,130,007), zeolite ZSM-5 (U.S. Pat. No. 3,702,886) and zeolite TS-1 (U.S. Pat. No. 4,410,501) have been disclosed.

Particularly, since zeolite ZSM-5 has specific catalytic activity and the degree of deactivation by heat treatment at high temperature is less, zeolite ZSM-5 has attracted attention as a catalyst for the last 20 years.

Most synthetic zeolites for such uses are prepared by hydrothermal synthesis at a high temperature (130°~200° C.) and under high pressure (20~80 atm). The synthetic zeolite thus prepared is in powder form having a particle size ranging from 1 $\mu$m to several $\mu$m.

A conventional zeolite is difficult to use as such because of this powder form, and therefore several methods for using various forms of zeolite such as a pellet, film and fiber have been disclosed.

Here, a zeolite in pellet form is obtained by blending the powered zeolite with an inactive ingredient such as alumina. In this case, however, it is difficult to properly use the adsorption surface because the reactant's diffusion rate is reduced when the pressure differences in a packed column increase excessively.

Recently, the preparation of a film form of zeolite for use as an effective separating membrane has been disclosed. A thin layer of zeolite is formed onto a support such as Teflon®, a filter paper or stainless steel by using a hydrothermal method [Sano et al., *J. Mater. Chem.*, 2, 141 (1992)]. A film form of zeolite with few surface defects such as pinholes or cracks is still under study.

A method for mixing a crystalline zeolite with a polyamide fiber, and then spinning the mixture to produce a textile form of zeolite is disclosed in Japanese Patent Laid-Open Publication No. Hei 4-333,639. Also, a method for coating a zeolite onto a ceramic fiber is disclosed in Japanese Patent Laid-Open Publication No. Hei 5-131,139. However, this method is difficult to apply due to its complexity.

SUMMARY OF THE INVENTION

To solve the above problems, it is an object of the present invention to provide fibrous zeolite ZSM-5 which can be directly used as a reinforcement material and provide sites on which other substances can be easily adsorbed and from which the adsorbed substances can be easily desorbed.

It is another object of the present invention to provide a preparation method of fibrous zeolite ZSM-5 which can be directly used as a reinforcement material and provide sites on which other substances can be easily adsorbed and from which the adsorbed substances can be easily desorbed.

According to an aspect of the present invention, there is provided a fibrous zeolite ZSM-5 represented by the following formula;

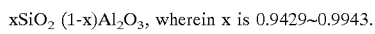

$x SiO_2 (1-x) Al_2 O_3$, wherein x is 0.9429~0.9943.

According to another aspect of the present invention, there is provided a preparation method of a fibrous zeolite ZSM-5 comprising the steps of:

(i) preparing a zeolite crystal through the following steps:
  (a) mixing a silicon oxide source and an organic base with stirring;
  (b) slowly adding an alcohol solution including a hydrolyzable aluminum compound to said mixture of silicon oxide source and organic base, adding an organic base to the reaction mixture, and heating the resultant;
  (c) adding water to the reaction mixture obtained in said step (b); and
  (d) preparing a mother liquor including zeolite crystal by slowly adding sodium hydroxide to the reaction mixture obtained in said step (c) at 100° C. and under atmospheric pressure, (ii) separating zeolite crystal from said mother liquor obtained through said step (i); and (iii) dispersing the zeolite crystal obtained in said step (ii) in water and drying the dispersion.

BRIEF DESCRIPTION OF THE DRAWINGS

The above objects and advantages of the present invention will become more apparent by describing in detail a preferred embodiment thereof with reference to the attached drawings in which:

FIG. 2 is a photograph showing an X-ray diffraction pattern of zeolite ZSM-5 according to the embodiment of the present invention;

DETAILED DESCRIPTION OF THE INVENTION

Figure 1A:
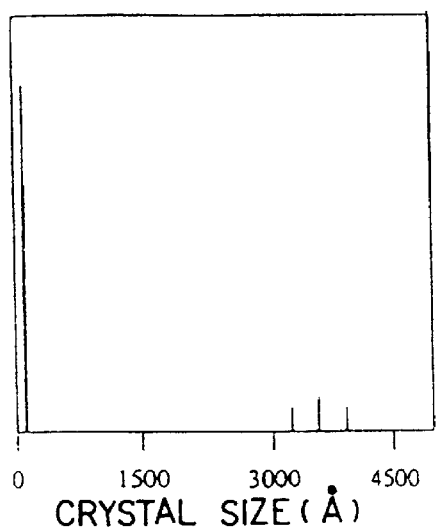
FIGS. 1A, 1B, 1C and 1D are graphs representing change in particle size with the lapse of time when zeolite ZSM-5 crystal particles are formed according to an embodiment of the present invention.

According to the present invention, zeolite ZSM-5 which is formed in a powder form only according to the conventional method can be formed in a fibrous form. That is, unlike conventional hydrothermal synthesis performed at a high temperature and under high pressure, a fibrous zeolite of the present invention is formed by synthesizing a zeolite crystal having a predetermined particle size at a low temperature and under atmospheric pressure, and then converting the zeolite crystal into the fibrous form of zeolite under appropriate conditions. At this time, the particle size of the zeolite crystal for formation of the fibrous form should be less than 500 nm.

Hereinafter, the preparation method of fibrous zeolite ZSM-5 according to the present invention will be described in detail.

First, a silicon oxide source is mixed with an organic base solution and then the mixture is stirred. Here, the organic base dissolves the silicon oxide source in gel state to facilitate the reaction with an aluminum oxide source to be added later. Also, a hydrolyzable aluminum compound as aluminum source is dissolved in alcohol in a separate vessel. Here, isopropyl alcohol is preferably used.

When the alcohol solution of the hydrolytic aluminum compound is obtained, this dilute solution is slowly added to the above mixture including the silicon oxide source. Here, preferably, molar ratio of the aluminum oxide source to the silicon oxide source in the mixture is 0.0029 to 0.03.

When the mixture of the silicon oxide source and the aluminum oxide source become clear with the lapse of time, organic base is further added. Here, the clarification of this solution means complete solubilization of silicon oxide source and aluminum oxide source.

In the present invention, the organic base facilitates the reaction of silicon oxide source and aluminum oxide source. However, extremely high pH hinders the growth of zeolite crystals. Thus, it is preferable that a molar ratio of organic base to silicon oxide source is 0.1 to 0.8 in order to form the zeolite crystal at an appropriate speed.

The reaction mixture is heated to evaporate alcohol and then sodium hydroxide solution is added. Then, the mixture is stirred and left alone to form crystalline zeolite ZSM-5 particles which are less than 500 nm in diameter. Here, the temperature range for obtaining the particles less than 500 nm in diameter under atmospheric pressure is 60°~100° C., since it takes a long time to obtain the zeolite crystal at temperatures below 60° C. and the zeolite crystal is rarely formed into the fibrous form at temperatures over 100° C. due to a particle size exceeding 500 nm.

Finally, zeolite ZSM-5 crystal is dispersed in water and then dried to obtain the fibrous zeolite. Here, preferably, the concentration of zeolite in water is 0.5~5 wt %.

Particularly, if a polar solvent is added prior to drying the zeolite dispersed in water, fibrous zeolite ZSM-5 of high aspect (length/radius) ratio is formed. Here, formaldehyde, methanol, formamide may be used as a proper polar solvent.

As a reactant for manufacturing fibrous zeolite ZSM-5 according to the present invention, silicon oxide source and aluminum oxide source which have been used in general can be utilized.

That is, preferably, tetraethylorthosilicate, silica sol, tetramethylorthosilicate, tetramethylesilane, tetrapropylorthosilicate are used as the silicon oxide source.

Also, as the hydrolyzable aluminum compound, aluminum ethoxide, aluminum butoxide, aluminum isopropoxide, aluminum sulfate are preferably used.

Also, it is preferably used as an organic base that tetramethylammonium hydroxide, tetraethylammonium hydroxide, tetrabutylammonium hydroxide, tetrapropylammonium hydroxide, tetraprophylammonium bromide, pyrolidine, propylamine, dipropylamine, tripropylamine are used.

Hereinafter, the preparation method of the fibrous zeolite ZSM-5 will be described with reference to specific examples and comparative examples, however, the present invention is not limited thereto.

<EXAMPLE 1>

1) Preparation of a zeolite crystal 45 g of tetraethylorthosilicate (TEOS) and 53 g of 20% aqueous tetrapropylammonium hydroxide (TPAOH) solution were mixed with stirring. 1.6 g of aluminum butoxide was dissolved in isopropyl alcohol in a separate vessel and then slowly added to the mixture of TEOS and TPAOH with stirring. After the solution including aluminum butoxide was completely added, the solution was continuously stirred for 15 minutes. As a result, the mixture became clear. 17 g of TPAOH was added to the clear mixture solution and then stirred for 5 minutes. Thereafter, the mixture was heated to 80° C. and maintained at this temperature for 4 hours to evaporate alcohol. Also, 0.86 g of sodium hydroxide was dissolved in 90 ml of water and then the aqueous sodium hydroxide solution was added to the above mixture from which alcohol was evaporated. Here, main components of the reaction mixture are as follows:

Al/Si=0.03 (mole/mole)

$H_2O$/Si=38 (mole/mole)

TPAOH/Si=0.032 (mole/mole)

NaOH/Si=0.1 (mole/mole)

While reacting the reaction mixture at 80° C. and under atmospheric pressure, a mother liquor including grown crystal particles was sampled according to reaction time. Then, the crystal particle size of the obtained sample was measured using a dynamic light scattering (DLS) method.

Figure 1B:
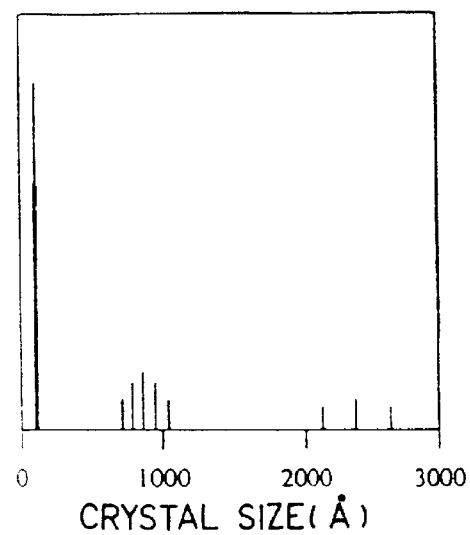
Figure 1C:
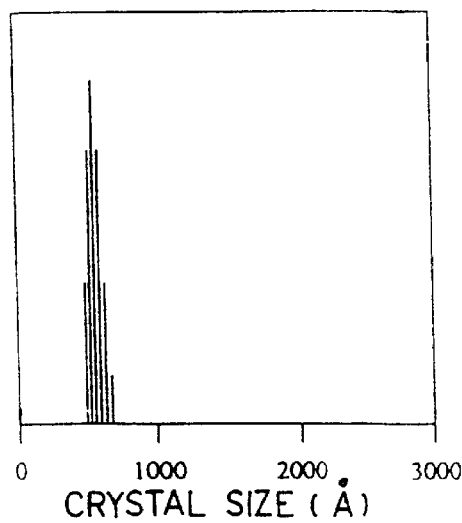
Figure 1D:
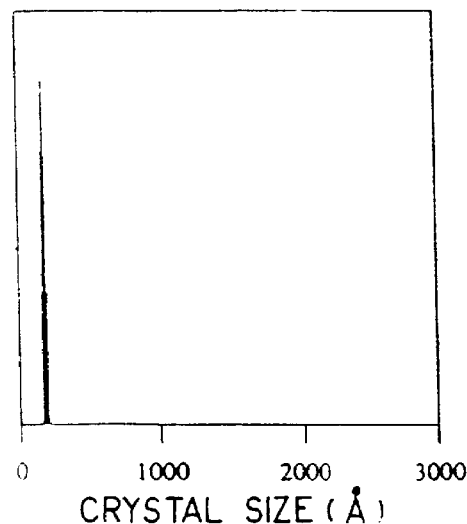

FIGS. 1A to 1D are graphs representing change in zeolite crystal particle size with the lapse of time. In detail, FIG. 1A shows the size of the ZSM-5 zeolite crystal in 72 hours, FIG. 1B shows the size of the ZSM-5 zeolite crystal in 210 hours, FIG. 1C shows the size of the ZSM-5 zeolite crystal in 522 hours, and FIG. 1D shows the size of the ZSM-5 zeolite crystal in 594 hours, respectively. As shown in FIGS. 1A to 1D, the crystal particle size was 562 nm in 522 hours, and decreased to 186 nm in 594 hours. However, the particle size was not decreased any more after 594 hours.

FIG. 2 shows a X-ray diffraction pattern obtained by using an X-ray diffractometer (D/MAX, Rikagu, Japan: CuK-α radiation). This diffraction pattern indicates that the obtained zeolite has crystallinity.

2) Formation of fibrous zeolite

Water was added to the mother liquor obtained through 594 hours of reaction in the above process 1) with the same weight ratio, and then the solution was centrifuged to separate crystal particles. The obtained crystal particles were dispersed into water with a final concentration of 0.5 wt %. The dispersion was dried at 100° C. for 10 hours to obtain a transparent zeolite.

Figure 3:
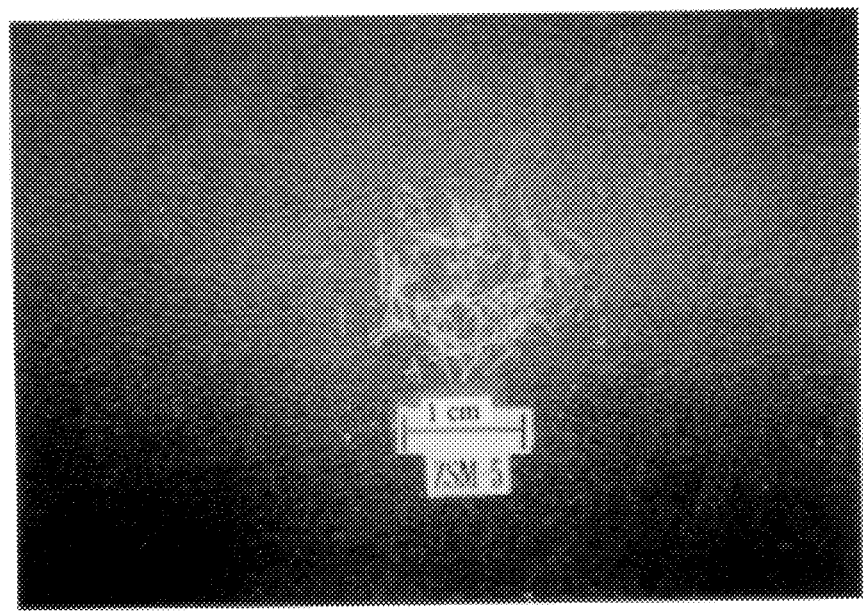
FIG. 3 is a photograph of fibrous zeolite ZSM-5 manufactured according to the embodiment of the present invention.

FIG. 3 is a photograph of fibrous zeolite ZSM-5 manufactured according to the embodiment of the present invention. As shown in FIG. 3, the obtained zeolite was in fibrous form of 10~12 mm length. Also, the aspect ratio of the obtained fibrous zeolite, calculated from the data of FIG. 3, was about 110.

Figure 4:
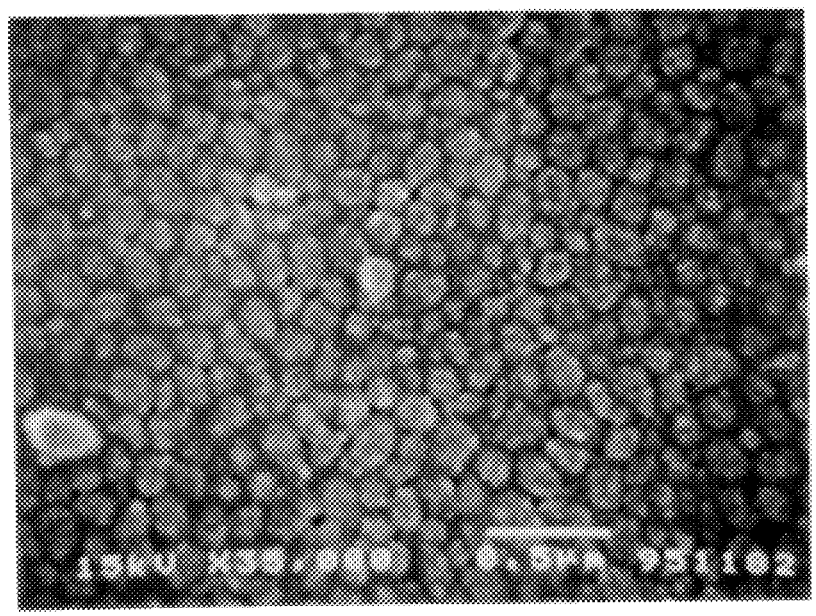
FIG. 4 is an electron microscopic photograph of fibrous zeolite ZSM-5 manufactured according to the embodiment of the present invention.

FIG. 4 is an electron microscopic photograph of fibrous zeolite ZSM-5 manufactured according to the embodiment of the present invention, wherein compact structure consisting of particles of about 200 nm in diameter was shown.

Figure 5:
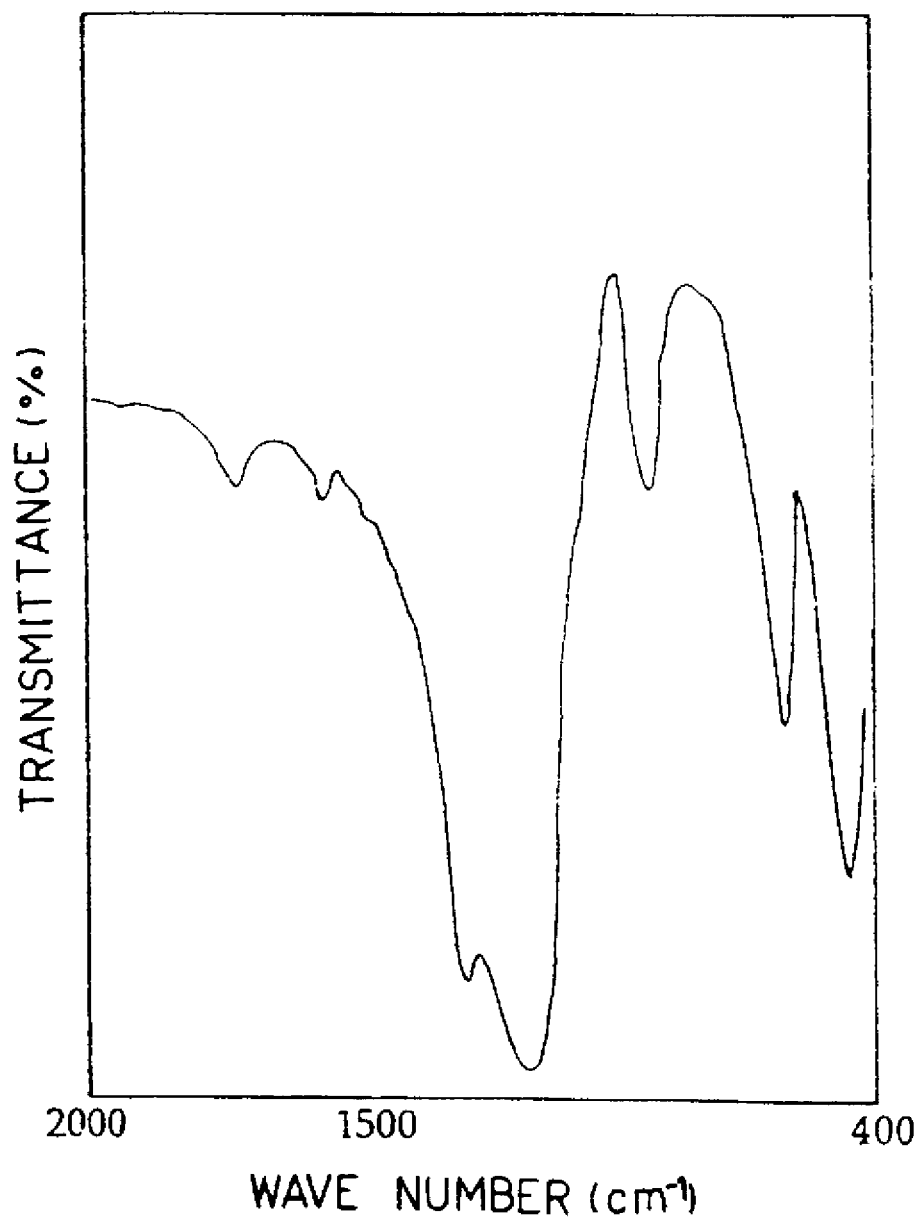
FIG. 5 is an IR spectrum of fibrous zeolite ZSM-5 manufactured according to the embodiment of the present invention.

Also, FIG. 5 is an IR spectrum of fibrous zeolite ZSM-5 manufactured according to the embodiment of the present invention, wherein a specific peak attributed to Si—O—Al bond was shown in the vicinity of 960 $cm^{-1}$.

<EXAMPLE 2>

A mother liquor including zeolite crystals was obtained in the same manner as described in example 1 except that the step of adding 0.2 g of formaldehyde was further included after the aqueous sodium hydroxide solution was added to the reaction mixture. Then, the fibrous zeolite was obtained through the same process as described in example 1. The aspect ratio of the obtained zeolite was 150, which was better than that of example 1 in fibrosis.

<EXAMPLE 3>

Zeolite crystals were obtained through the same manner as described in example 1. The obtained zeolite crystals were dispersed in water with a final concentration of 3 wt %. Then, the dispersion was dried in the same manner as described in example 1 to obtain a fibrous zeolite. The aspect ratio of the obtained fibrous zeolite was 65, which was not better than that of example 1 in fibrosis.

<EXAMPLE 4>

22.5 g of TEOS and 26.5 g of 20% TPAOH were mixed with stirring. 0.096 g of aluminum butoxide was dissolved in 10 g of isopropyl alcohol in a separate vessel and then the solution was dropped into the mixture of TEOS and TPAOH with stirring. After the solution including aluminum butoxide was completely added, the solution was continuously stirred for 15 minutes. As a result, the mixture became clear. 8.5 g of TPAOH was added to the clear mixture solution and then stirred for 5 minutes. Thereafter, the mixture was heated to 80° C. and maintained at this temperature for 4 hours to evaporate alcohol. Also, 0.86 g of sodium hydroxide was dissolved in 90 ml of water and then the obtained aqueous sodium hydroxide solution was added to the above heated mixture from which alcohol was evaporated. Here, main components of the reaction mixture are as follows:

Al/Si=0.0029 (mole/mole)

$H_2O$/Si=38 (mole/mole)

TPAOH/Si=0.032 (mole/mole)

NaOH/Si=0.1 (mole/mole)

After reacting the reaction mixture at 80° C. and under atmospheric pressure for 594 hours, a mother liquor including grown crystal particles was sampled. Then, the particle size of the obtained sample was measured using a dynamic light scattering method. Here, the particle size of the obtained zeolite was about 100 nm. Thereafter, the fibrous zeolite was obtained through the same process as described in example 1. The aspect ratio of the obtained zeolite was about 150.

<COMPARATIVE EXAMPLE 1>

ZRC-Z-Y 5.6. zeolite of 1,000 nm (1 μm) was dispersed in water with a final concentration of 0.5 wt %. Then, the dispersion was dried in the same manner as described in example 1 and then it was observed whether or not the crystals were grown in a fibrous form. However, the fibrous form of crystals was not formed.

<COMPARATIVE EXAMPLE 2>

Zeolite crystals were obtained through the same method as described in example 1. The obtained crystal particles were dispersed in water with a final concentration of 6 wt %. Then, the dispersion was dried in the same method as described in example 1 and then it was observed whether or not the crystals were grown in a fibrous form. However, the fibrous form of crystals was not formed.

<COMPARATIVE EXAMPLE 3>

22.5 g of TEOS and 26.5 g of 20% TPAOH were mixed with stirring. 1.774 g of aluminum butoxide was dissolved in 56.03 g of isopropyl alcohol in a separate vessel and then the solution was dropped into the mixture of TEOS and TPAOH with stirring. After the solution including aluminum butoxide was completely added to the mixture of TEOS and TPAOH, the mixture solution was continuously stirred for 15 minutes. As a result, the mixture became clear. 8.5 g of TPAOH was added to the clear mixture solution and then stirred for 5 minutes. Thereafter, the mixture was heated to 80° C. and maintained at this temperature for 4 hours to evaporate alcohol. Also, 0.86 g of sodium hydroxide was dissolved in 90 ml of water and then the obtained aqueous sodium hydroxide solution was added to the above heated mixture from which alcohol was evaporated. Here, main components of the reaction mixture are as follows:

Al/Si=0.067 (mole/mole)

$H_2O$/Si=38 (mole/mole)

TPAOH/Si=0.32 (mole/mole)

NaOH/Si=0.1 (mole/mole)

After reacting the reaction mixture at 80° C. and under atmospheric pressure for 594 hours, a mother liquor including grown crystal particles was sampled. Then, the particle size of the obtained sample was measured using a dynamic light scattering method. Here, the particle size of the obtained zeolite was about 1000 nm (1 μm). Thereafter, it was observed whether the crystals were grown in a fibrous form. However, the fibrous form of crystals was not formed.

<COMPARATIVE EXAMPLE 4>

The zeolite crystals were obtained by the same method as described in example 1. The obtained crystal particles were dispersed in water with a final concentration of 0.5 wt %.

The dispersion was dried at 150° C. for 10 hours and then it was observed whether the crystals were grown in a fibrous form. However, the fibrous form of crystals was not formed.

TABLE

|  |  | reaction condition (mole/mole) |  |  |  | polar solvent addition | particle size (nm) | drying |  |  |  |
|---|---|---|---|---|---|---|---|---|---|---|---|
|  |  | Al/Si | $H_2O$/Si | TPAOH/Si | NaOH/Si |  |  | particle conc.* | temp.** (°C.) | fibrous growth | aspect ratio*** |
| example | 1 | 0.03 | 38 | 0.32 | 0.1 | x | 186 | 0.5 | 100 | o | 110 |
|  | 2 | 0.03 | 38 | 0.32 | 0.1 | o | 200 | 0.5 | 100 | o | 150 |
|  | 3 | 0.03 | 38 | 0.32 | 0.1 | x | 500 | 3.0 | 100 | o | 65 |
|  | 4 | 0.0029 | 38 | 0.32 | 0.1 | x | 100 | 0.5 | 100 | o | 190 |

TABLE-continued

|  |  | reaction condition (mole/mole) | | | | polar | | | drying | | |
|---|---|---|---|---|---|---|---|---|---|---|---|
|  |  | Al/Si | H₂O/Si | TPAOH/Si | NaOH/Si | solvent addition | particle size (nm) | particle conc.* | temp.** (°C.) | fibrous growth | aspect ratio*** |
| compa- | 1 | — | — | — | — | x | 1000 | 0.5 | 100 | x | — |
| rative | 2 | 0.03 | 38 | 0.32 | 0.1 | x | 300 | 6.0 | 100 | x | — |
| example | 3 | 0.067 | 38 | 0.32 | 0.1 | x | 1000 | 0.5 | 100 | x | — |
|  | 4 | 0.03 | 38 | 0.32 | 0.1 | x | 350 | 0.5 | 100 | x | — |

Note:
*; particle concentration is represented by weight % of the zeolite to water.
**; drying temperature of the zeolite dispersed in water.
***; aspect ratio = length/radius.

As described above, the fibrous zeolite ZSM-5 according to the present invention can be directly used as a reinforcement material because of its fibrous form, and has sufficient sites on which other substances can be easily adsorbed and from which the adsorbed substances can be easily desorbed. Also, since the zeolite of the present invention is transparent, it can be applied to an optical material.

What is claimed is:

1. A fibrous zeolite ZSM-5 represented by the following formula;

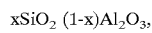

xSiO₂ (1-x)Al₂O₃, wherein x is 0.9429~0.9943.

2. A method of preparing a fibrous zeolite ZSM-5 comprising the steps of:
   (i) preparing a zeolite crystal through the following steps:
      (a) mixing a silicon oxide source and an organic base with stirring;
      (b) slowly adding an alcohol solution including a hydrolyzable aluminum compound to said mixture of silicon oxide source and organic base, adding an organic base to the reaction mixture, and heating the mixture;
      (c) adding water to the reaction mixture obtained in said step (b); and
      (d) preparing a mother liquor including zeolite crystal by slowly adding sodium hydroxide to the reaction mixture obtained in said step (c) at 100° C. and under atmospheric pressure,
   (ii) separating zeolite crystal from said mother liquor obtained through said step (i); and
   (iii) dispersing the zeolite crystal obtained in said step (ii) in water and drying the dispersion.

3. A method of preparing a fibrous zeolite ZSM-5 as claimed in claim 2, wherein said silicon oxide source is at least one compound selected from the group consisting of tetraethylorthosilicate, silica sol, tetramethylorthosilicate, tetramethylesilane and tetrapropylorthosilicate.

4. A method of preparing a fibrous zeolite ZSM-5 as claimed in claim 2, wherein said hydrolyzable aluminum compound is at least one compound selected from the group consisting of aluminum ethoxide, aluminum butoxide, aluminum isopropoxide and aluminum sulfate.

5. A method of preparing a fibrous zeolite ZSM-5 as claimed in claim 2, wherein said organic base is at least one compound selected from the group consisting of tetramethylammonium hydroxide, tetraethylammonium hydroxide, tetrabutylammonium hydroxide, tetrapropylammonium hydroxide, tetraprophylammonium bromide, pyrolidine, propylamine, dipropylamine and tripropylamine.

6. A method of preparing a fibrous zeolite ZSM-5 as claimed in claim 2, wherein the molar ratio of said organic base to said silicon oxide source is 0.1~0.8.

7. A method of preparing a fibrous zeolite ZSM-5 as claimed in claim 2, wherein the molar ration of said hydrolyzable aluminum compound to said silicon oxide source is 0.0029~0.03.

8. A method of preparing a fibrous zeolite ZSM-5 as claimed in claim 2, wherein in said step (iii), the zeolite is dispersed in water with a final concentration of 0.5~5 wt %.

9. A method of preparing a fibrous zeolite ZSM-5 as claimed in claim 2, further comprising the step of adding at least one polar solvent selected from the group consisting of formaldehyde, methanol and formamide to said dispersion.

* * * * *